UNITED STATES PATENT OFFICE.

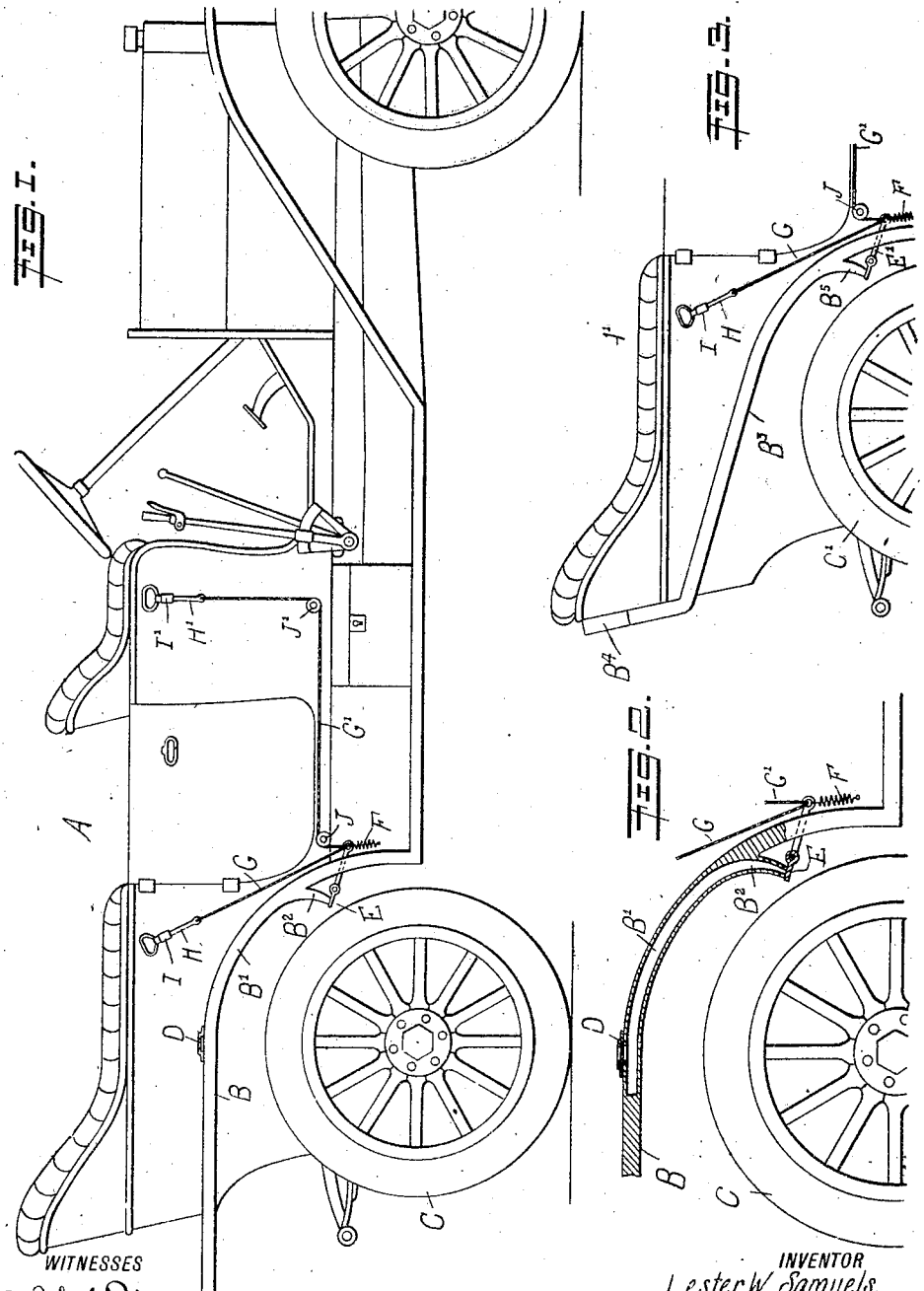

LESTER W. SAMUELS, OF NEW YORK, N. Y.

SANDING DEVICE FOR AUTOMOBILES.

1,044,919.  Specification of Letters Patent.  Patented Nov. 19, 1912.

Application filed July 26, 1912. Serial No. 711,748.

*To all whom it may concern:*

Be it known that I, LESTER W. SAMUELS, a citizen of the United States, and a resident of the city of New York, borough of Manhattan, in the county and State of New York, have invented a new and Improved Sanding Device for Automobiles, of which the following is a full, clear, and exact description.

My invention is an improvement in sanding devices for automobiles and similar vehicles in which a hollow mud-guard is utilized as a sand receptacle and provided with means for controlling the discharge of sand upon the periphery of the wheels for the purpose of preventing skidding of the vehicle.

The details of construction, arrangement, and operation are as hereinafter described, and illustrated in the accompanying drawing, in which—

Figure 1 is a side elevation of an automobile provided with the improved sanding device; Fig. 2 is a sectional side elevation of the sanding device; and Fig. 3 is a side elevation of a modified form of the improvement shown applied to an automobile.

An automobile or similar power-driven vehicle A is provided with a mud guard B extending over each of the rear wheels C, and a portion of the forwardly and downwardly-extending part of the mud guard B is made hollow to provide a sand box B' having a filling opening D at the top for filling the sand box B' with sand or other similar gritty material. The lower end of the hollow part B' of the guard B terminates in a downwardly and rearwardly-curved spout B² terminating in close proximity to the upper side of the wheel rim C, and the said spout B² is adapted to be closed and opened by a suitable valve E under the control of a person in the automobile or similar vehicle A. When the valve E is open the sand or similar substance contained in the sand box flows down through the spout B² onto the peripheral face of the wheel C so that the said peripheral face is sanded to prevent the wheel from slipping or skidding on wet or slippery roadways.

It is understood that the peripheral face of the wheel C takes up considerable of the moisture of the roadway and consequently the sand discharged onto the peripheral face of the wheel C by way of the spout B² readily adheres to the wheel and therefore prevents the latter from skidding on the roadway.

The valve E shown in the drawings is in the form of a lever valve pressed on by a spring F to normally hold the valve E in a closed position, and the lever valve E is connected with ropes or cables G, G' terminating in handled rods H, H' mounted to slide in suitable guideway I, I' arranged on the vehicle body in close proximity to the rear and front seats therein, so that a person on the said seats can pull the handled rod H or H' to swing the valve E into open position for the discharge of the sand through the spout B² onto the wheel C. When the person releases the handled rod H or H' the spring F pulls the valve E back into closed position. The rope or cable G' extends over guide pulleys J, J' held on the vehicle body so as to properly guide the rope or cable G' to the front seat.

It is understood that the same sanding device is arranged on each side of the vehicle.

As shown in Fig. 3 the mud guard B³ is made hollow and extends rearwardly and upwardly to the back of the vehicle body to connect with a sand box B⁴ held on the back of the vehicle body and supplying both mud guards with sand or a similar substance. The lower portion of the hollow mud guard B³ terminates in a spout B⁵ similar to the spout B² and adapted to be closed and opened by a valve E', similar to the valve E, and actuated in a like manner.

Having thus described my invention, I claim as new and desire to secure by Letters Patent:

1. In an automobile, the combination with a wheel, of a hollow mud-guard arranged over the wheel and having a spout extending from its lower end and terminating in close proximity to the upper portion of the wheel rim, so as to discharge directly upon the latter, a flat spring-pressed valve pivoted to the side of the vehicle body, and a pull-rope connected with said valve, and a handle arranged adjacent to the chauffeur's seat, as described.

2. In a vehicle, the combination with a wheel, of a mud guard over the said wheel and having its upper portion made hollow to form a sand-containing receptacle, the lower end of the hollow portion of the said mud guard having a spout terminating in close proximity to the upper portion of the wheel rim so as to direct a stream of sand thereon, and a manually-controlled valve controlling the said spout.

In testimony whereof I have signed my name to this specification in the presence of two subscribing witnesses.

LESTER W. SAMUELS.

Witnesses:
 THEO. G. HOSTER,
 JOHN P. DAVIS.